UNITED STATES PATENT OFFICE.

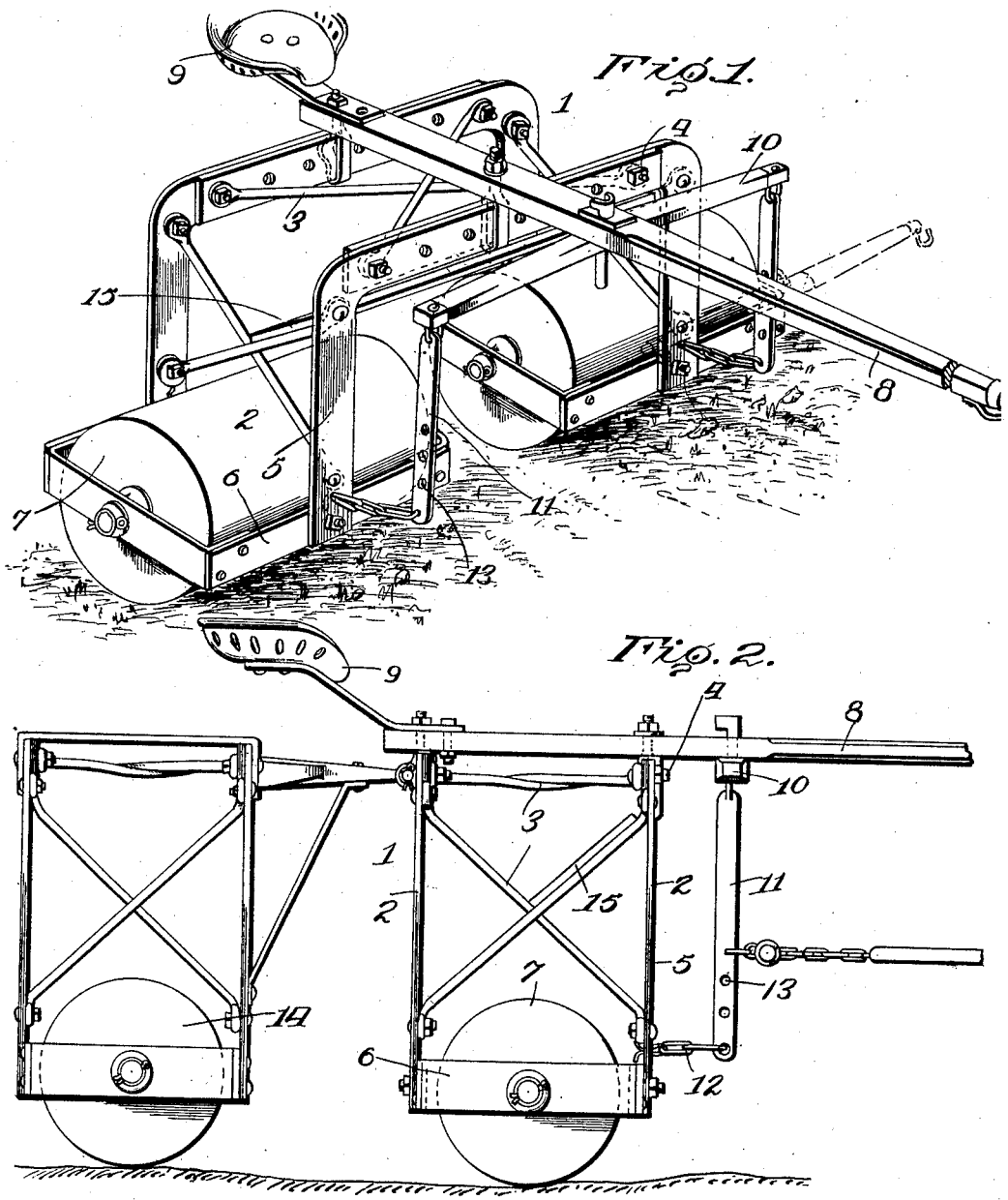

JAY BROOKS, OF LA FAYETTE, OREGON.

LAND-ROLLER.

1,002,492. Specification of Letters Patent. Patented Sept. 5, 1911.

Application filed May 24, 1911. Serial No. 629,204.

*To all whom it may concern:*

Be it known that I, JAY BROOKS, citizen of the United States, residing at La Fayette, in the county of Yamhill and State of Oregon, have invented certain new and useful Improvements in Land-Rollers, of which the following is a specification.

This invention relates to land rollers and especially to rollers of this character adapted to be used in nurseries, and has for its object to provide a main frame adapted to straddle a row of plants and having pivotally mounted at its ends roller frames in which rollers are journaled. Means is provided for elongating the main frame laterally so that the rollers may operate close to or remote from the sides of the plants. Also by slight rearrangement the roller may be adapted to be used for operating upon the soil in open fields.

For a full understanding of the invention reference is to be had to the following description and accompanying drawings, in which:

Figure 1 is a perspective view of the roller; Fig. 2 is a side elevation of the same.

Corresponding and like parts are referred to in the following description and indicated in all the views of the accompanying drawings by the same reference characters.

The roller consists of a frame 1 which is made up of forward and rear pieces 2, these pieces being held together by cross braces 3. The pieces 2 are made in sections, which sections are held together by bolts 4 which pass transversely through the sections of the pieces. Therefore it will be seen that by removing the said bolts the sections of the pieces may be extended or contracted with relation to each other so that means is provided for elongating or contracting the frame of the roller in a direction transverse to its line of draft. The pieces 2 include relatively long vertical standards 5 between the lower ends of which are pivotally mounted rectangular roller frames 6. Rollers 7 are journaled in the frames 6 and have their axes lying in the same vertical plane in a line transversely to the line of draft. A tongue 8 is attached to the upper intermediate portions of the pieces 2 and at its rear end carries a seat 9. A double-tree 10 is pivoted to the tongue 8 in advance of the foremost piece 2, and bars 11 are pivoted at their upper ends to the ends of the said double-tree 10. Links 12 connect the lower portions of the bars 11 with the lower portions of the standards 5 of the pieces 2 and swingletrees (not shown) are adapted to be connected with perforations 13 with which the bars 11 are provided. Therefore it will be seen that provision is made for adjustably positioning the swingletrees upon the bars 11. When it is desired to use the rollers upon fields, a supplemental roller 14 is attached to the frame 1 and is adapted to trail along the space between the inner ends of the rollers 7 and operate upon the surface of the soil between the said rollers 7 and which is not operated upon by the last said rollers. A foot board 15 is mounted upon the end braces 3 of the frame 1.

As heretofore stated the roller is especially adapted for use in nurseries, where the rollers 7 may operate at the opposite sides of a row of plants in close proximity to or remote from the same, as desired. By reason of the fact that the frames 6 are pivotally attached at points midway between their ends to the lower ends of the standards 5, the said frames together with the rollers carried by the same may swing vertically so that the rollers will operate upon the soil at the opposite sides of the row of plants whether the soil is level or is inclined in different directions at the opposite sides of the row. Therefore a flexible roller structure is provided.

Having thus described the invention, what is claimed as new is:

A roller comprising frame pieces having vertically disposed end standard portions, cross braces securing the said frame pieces together, rectangular roller frames pivotally mounted at points midway between their ends between the lower ends of the standard portions of the frame pieces, rollers journaled in the roller frames and having their axes in the same vertical plane and extending transversely to the line of draft of the roller structure, a tongue mounted upon the frame pieces, a double-tree pivoted to the tongue in advance of the frame pieces, bars hanging pendent from the end portions of the double-tree, and links pivotally connecting the lower ends of the bars with the lower forward standard portions of the frame pieces.

In testimony whereof, I affix my signature in presence of two witnesses.

JAY BROOKS. [L. S.]

Witnesses:
 ISABEL BRYAN,
 P. P. OLDS.

Copies of this patent may be obtained for five cents each, by addressing the "Commissioner of Patents, Washington, D. C."